May 1, 1934. P. GANGLER 1,956,762
DEVICE FOR DETECTING AND INDICATING INSUFFICIENTLY
FILED PACKAGES IN PACKING MACHINES
Filed Feb. 20, 1933 5 Sheets-Sheet 1

Paul Gangler
INVENTOR
his ATTY.

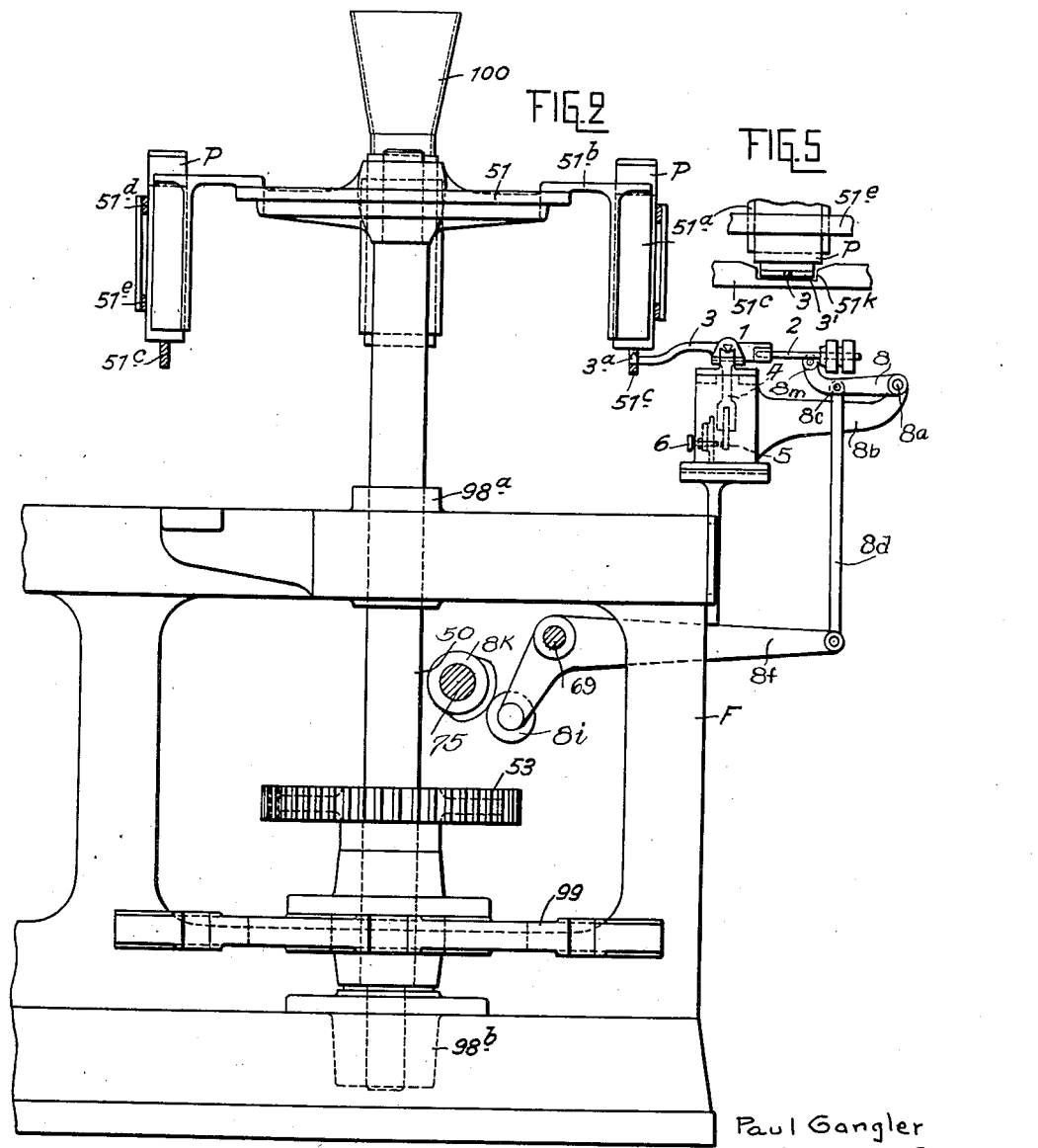

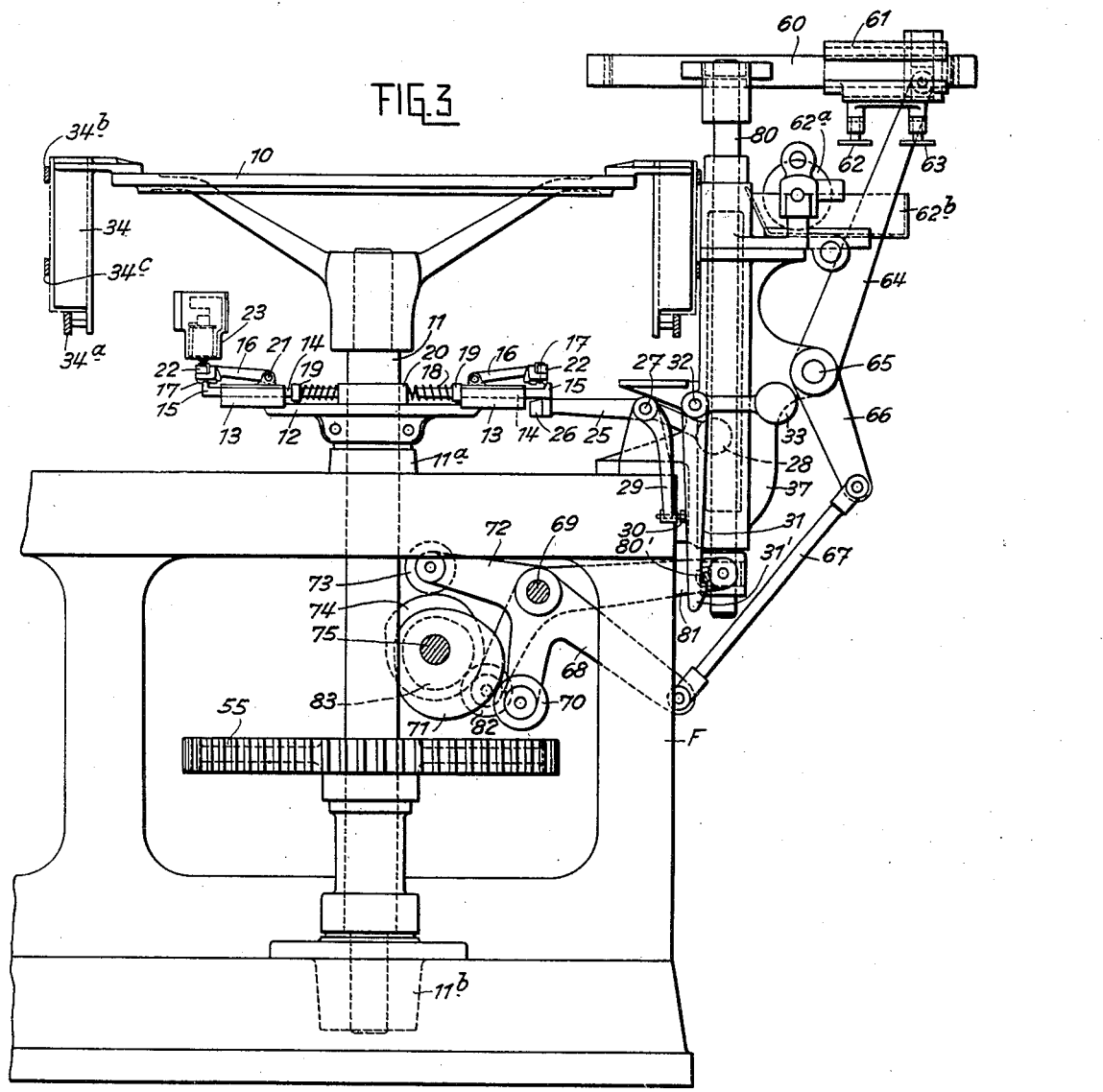

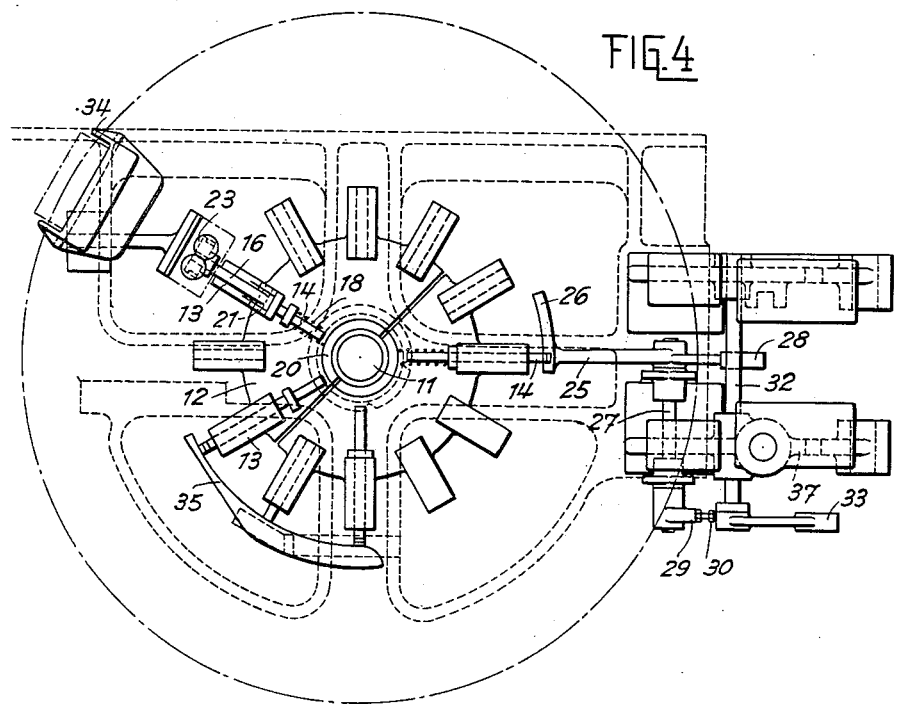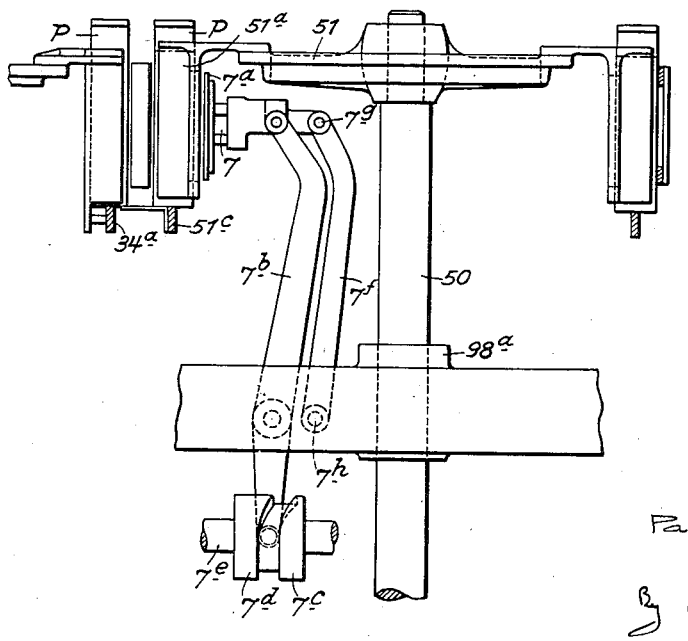

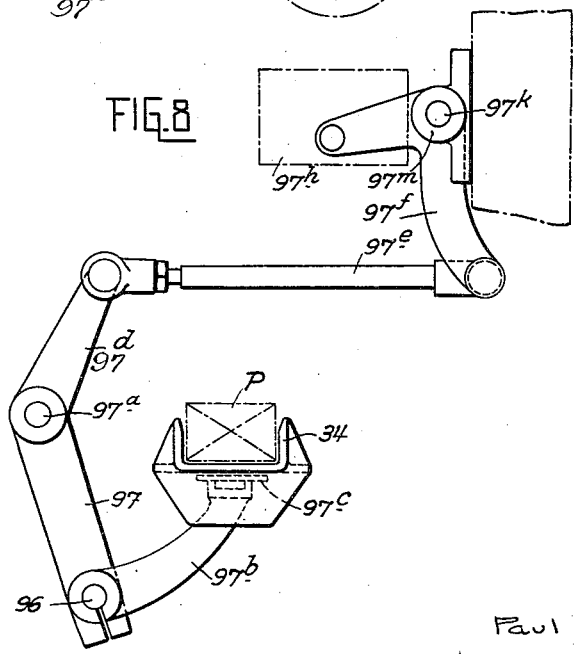

Patented May 1, 1934

1,956,762

UNITED STATES PATENT OFFICE 1,956,762

DEVICE FOR DETECTING AND INDICATING INSUFFICIENTLY FILLED PACKAGES IN PACKING MACHINES

Paul Gangler, Esslingen, Germany, assignor to the firm Fr. Hesser, Maschinenfabrik-Aktiengesellschaft, Stuttgart-Cannstatt, Germany Application February 20, 1933, Serial No. 657,590
In Germany December 14, 1931

7 Claims. (Cl. 226—75)

My invention relates to packing machines in which packages are conveyed step-by-step to successive stations for filling, closing and otherwise operating on the packages. The invention relates more particularly to means for indicating or drawing attention to insufficiently filled packages, so that distribution of such insufficiently filled packages is prevented. In the embodiment of my invention herein disclosed, a package on its way through the machine reaches a weighing scale at a station situated between the stations for filling and closing the package, which weighing scale, in case a package is deficient in weight, energizes an electromagnet which renders inoperative the gumming mechanism for the top closure of the package when, or shortly before, the insufficiently filled package arrives at the station provided with this arrangement. As an insufficiently filled package consequently remains unsealed, it is at once recognizable after leaving the machine as an insufficiently filled package. It can then be filled by hand to the correct weight and closed or sealed.

The invention is shown by way of example in the accompanying drawings, in which:—

Figure 2 is a side-elevation of the part comprising the filling wheel,

Figure 1:
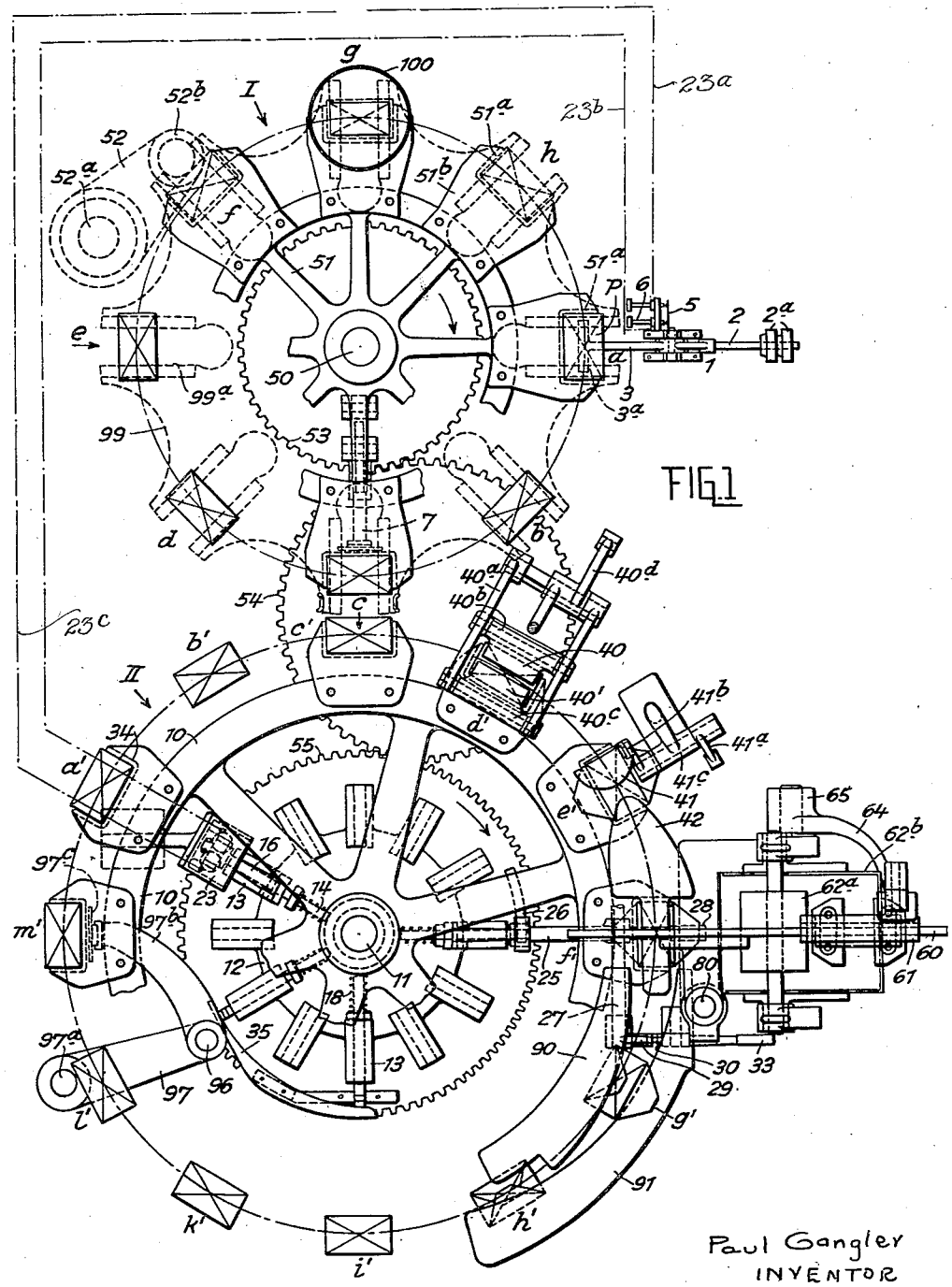
Figure 1 is a plan view of the principal parts of the packing machine.

Figure 3 is an elevation of the part comprising the closing apparatus, together with the stop and locking device, Figure 4 is a plan view of a part of the closing mechanism, Figure 5 is a front view of a detail of Figure 2, Figure 6 shows, in side-elevation, the mechanism for transferring the bag from the filling mechanism into the closing mechanism, Figure 7 is a side-elevation of the mechanism for ejecting the filled package from the machine, and Figure 8 a plan of the mechanism shown in Fig. 7.

The invention is illustrated, by way of example, in connection with a packing machine in which the packages are filled in a separate apparatus I having suitable intermittently operating feeding mechanism and are then transferred from this apparatus to the feeding mechanism of a separate apparatus II which operates in step with apparatus I and serves for closing or sealing the packages. The feeding mechanisms are provided in known manner with package receiving means, for example, pocket-shaped receptacles, in which the packages are conveyed during the step-by-step movement of the feeding mechanisms to the successive stations $a$ to $h$ and $a'$ to $m'$ of the two apparatus I and II.

In the illustrated embodiment, the feeding mechanism of the apparatus I is designed as a wheel 51 secured to the shaft 50 which is rotatably mounted in suitable bearings $98^a$ and $98^b$ of the machine frame F. Upon the shaft 50 there is secured a Maltese-cross wheel 99 provided with radial recesses $99^a$. Intermittent rotation is imparted to this wheel in the well-known manner by means of a crank 52 secured to a shaft $52^a$ which is continuously rotated by any well known driving mechanism (not shown). During rotation of shaft $52^a$, an anti-friction roller $52^b$ of the crank 52 engages a recess $99^a$ of the Maltese-cross wheel 99 and imparts to it a feeding impulse.

Pocket-like receptacles $51^a$ for receiving and conveying the bags P are secured to the wheel 51 by means of angular flanges $51^b$. The packages P rest on a suitable supporting rail $51^c$ suitably secured to the machine frame. There are also provided in the well known manner lateral circular rails $51^d$ and $51^e$ embracing the path of the packages.

As shown in Fig. 3, the feeding device of the part II comprises a conveyor wheel 10 with pockets 34, a lower supporting rail $34^a$ and lateral rails $34^b$ and $34^c$. The wheel 10 is secured to a shaft 11 rotatably mounted in the bearings $11^a$ and $11^b$ and intermittently rotated by means of the toothed wheels 55 and 54 from the toothed wheel 53 secured to the shaft 50.

In the present case, an empty package P is introduced by suitable means at the station $e$ into a receptacle $51^a$ of apparatus I, and at the station $g$ the package is filled from a suitable filling means, such as the hopper 100, in a manner well known in the art. At the station $c$, the package is transferred from the receptacle $51^a$ to the receptacle 34 at the station $c'$ of the feeding wheel 10 of the closing apparatus II.

The mechanism for transferring the packages from $51^a$ to 34 comprises a pusher rod 7, (Fig. 6), provided with a push plate $7^a$ adapted to pass through a suitable opening in the rear side of the pockets $51^a$. A reciprocating motion may be imparted to the said pusher rod 7 by means of a double-armed lever $7^b$ suitably pivoted on the machine frame and having a roller $7^c$ engaging a suitable cam-shaped groove of a drum-like eccentric $7^d$ mounted on a driving shaft $7^e$ which is suitably rotated by customary means. For parallel guidance of the pusher-rod 7 there is provided a link 7f pivoted to the said rod at 7g and to the machine frame at 7h.

The sealing of the packages is effected at stations d', e' and so on of the sealing apparatus II. The illustrated apparatus is particularly adapted to close packages consisting of an inner cardboard envelope having the known four separate closing flaps and of an outer bag of paper or the like.

At the station d', the two broad separate flaps of the inner envelope are folded down by two swinging folders 40, 40' which are rotatably mounted by means of pins 40b and 40c in a suitable frame 40a mounted on the machine table, and the said folders are operated by a suitable driving mechanism comprising the operating lever 40d. This folding mechanism and its drive are well known and customary in the art and, therefore, require no further or detailed description or illustration.

At the station e', the rearward flap (in the direction of feed) of the outer envelope together with the adjacent flap of the inner envelope is folded down by an oscillating folder 41 which is operated by means of the operating levers 41a, 41b secured to the pivot bolt 41c. The front flap of the outer envelope together with the adjoining flap of the inner envelope is folded down during the feed of the package from station e' to station f' by means of a suitable stationary folding rail 42. In this way, two triangular lateral flaps have been formed which are now provided at station f' with an adhesive.

The device for applying the adhesive or glue is also designed and operated in a well known manner. It comprises, Figs. 1 and 3, a guide bar 60 and a slide 61 adapted to be reciprocated on the bar 60 and carrying gumming bars 62, 63. Horizontal reciprocation is imparted to the said slide 61 by means of the lever 64 pivotally mounted on the bolt 65 on which a further lever 66 is fixed. This latter lever is connected by means of a link 67 to a lever 68 pivoted at 69 and carrying two rollers 70 and 73 engaging eccentrics 71 and 74 secured to a driving shaft 75. For imparting vertical reciprocation to the slide 61, its guide bar 60 is secured to a rod 80 vertically guided in suitable bearings of the frame. To the under end of this rod is pivoted a double-armed lever 81 rotatably mounted on bolt 69 and carrying an anti-friction roller 82 which is in operative contact with a suitable eccentric 83 secured to the said driving shaft 75.

Glue is applied to the said bars 62, 63 during their horizontal reciprocation by means of a roll 62a which is rotated in a well known manner in a glue containing case 62b. The folding down of the gummed flaps of the package is produced by means of suitable stationary folding rails 90 and 91 during the further feed of the package. If desired there may be also a label attached to the seal or package.

The ejection of the finally sealed package is effected at the station m' by means of an ejecting plate 97c, Figs. 7 and 8, adapted to pass through a suitable recess in the rearside of the pockets 34. The said plate is secured to a lever 97b rigidly connected by means of the bolt 96 to a lever 97 which is fixed upon a bolt 97a. Said bolt is rotatably mounted in a suitable bearing of the machine frame F, and a lever 97d is secured to the lower end of the bolt 97a and connected by a link 97e to a double-armed lever 97f carrying an anti-friction roller 97g engaging a suitable cam-shaped groove (not shown) of a drum-like eccentric 97h which is secured to a suitably rotated driving shaft 97i of the machine. Said lever 97f is rotatably supported on a bolt 97k fixed in a sleeve 97m which is secured to the machine frame F.

According to the invention, after the package has been filled at station g, it advances in the filling apparatus I until it reaches a weighing device 1 which is located, for example, at station a. The weighing device, which may be of any suitable construction, has in the present case a weight lever 2 provided with two adjustable weights 2a and a load lever 3 provided with a transverse supporting rail piece 3a at its forward end. Said rail piece 3a projects into a suitable recess 51k of the supporting rail 51c, as shown in Figs. 2 and 5. The load beam 3 is provided with a downwardly extending member 4 carrying a contact consisting, for example, of a leaf spring 5 adapted to cooperate with two stationary adjustable contact pins 6 arranged in the circuit 23a, 23b, 23c of an electro-magnet 23 arranged in the closing apparatus II as clearly shown in Fig. 1.

Any well known means may be used to restrain the load beam 3 in inoperative position during the intermittent advance of the carriers 51a. Means for this purpose are well exemplified in German Patent 337,669. In the embodiment illustrated in Fig. 2 of the accompanying drawings, there is arranged in the well known manner under the scale 1 a lever 8 pivoted at 8a to a suitable bracket 8b. Beneath the weight lever 2, the free end of the lever 8 is provided with a laterally extending pin 8m, and between this pin and the pivot 8a the lever 8 is connected by a link 8d with the free end of a toggle lever 8f pivotally supported on the bolt 8f. The shorter arm of lever 8f carries a roller 8i which in the well known manner is drawn by a spring (not shown) into operative engagement with an eccentric 8k secured to a suitable driving shaft 75. The operation of lever 8 is as follows:— Immediately before and during each advance of the wheel 51 the pin 8m of lever 8 is swung from its inoperative lowered position (not shown) upwardly against the weight lever 2 and holds the load lever 3 depressed against the bottom of the recess 51k in the supporting rail 51c, while after completion of the advance movement of the wheel 51, i. e., when the latter is at rest, the lever 8 is again moved downwardly from lever 2 and the lever 3 is released. It will, therefore, be understood that after each feeding stop of the wheel 51 the rail 3a is free to bear against the bottom of the filled package reaching the station a. In packages of the correct weight, the weighing machine is not tipped. If, on the other hand, an insufficiently filled package reaches the load lever 3 of the weighing device 1, the weight lever 2 swings downwards, and the leaf spring 5 will close the contacts 6 and the circuit 23a, 23b, 23c of the said magnet 23, and this magnet then releases a suitable locking device, which acts to prevent the gumming bars 62, 63 from conveying gum to the said triangular sealing flaps or points of the package.

For this purpose, in the present form of construction according to Figures 1, 3 and 4, a disc 12 is secured on the driving shaft 11 below the feed wheel 10 of the closing or sealing apparatus II, and the disc 12 carries guiding members 13 for radially displaceable bolts 14. These bolts are the same in number as the receptacles 34 and a bolt 14 is arranged below each receptacle. The bolts 14 are provided at their front end with a nose-like projection 15, over which engages normally a locking lever 16 having a recess 17 which engages the projection 15 and locks the bolt against the action of a spring 18 coiled round the rear end of the bolt. The spring 18 bears at one end against the hub 20 of the said disc 12, and at the other end against a collar 19 fixed on the bolt 14. The lever 16 is pivotally mounted on the pin 21 provided on the guide member 13, and carries at its free end a suitable armature 22 which is adapted to co-operate with the poles of the said magnet 23. The electromagnet 23 is arranged at a station a' situated between the ejection station k' and the transfer station c' of the closing apparatus II, and this station a' is chosen so that the number of the feed steps of the feeding mechanism of the filling apparatus I from the working station a provided with the weighing machine 1 to the transfer station c of the filling apparatus I corresponds to the number of the feed steps from the working station a' provided with the electromagnet 23 to the transfer station c' of the closing apparatus II. If thus, for example, there are the working steps a, b, c from the weighing device 1 of the filling apparatus I to the transfer station c, the magnet 23 is accordingly arranged to coincide with the steps a', b', c' of the feed-wheel of the closing apparatus, that is, arranged at a'.

With insufficiently filled packages the magnet 23 is excited by the closed circuit, so that it attracts the armature 22 of the locking lever 16 of the empty receptacle situated at the station a', and thus frees the projection 15 of the respective bolt 14, and this latter under the action of the spring 18 can spring forward and assume the position shown at the right in Figure 3. As the number of feed steps of this receptacle up to the transfer station is equal to the number of the steps of the receptacle containing the insufficiently filled package in the filling apparatus, the insufficiently filled package is transferred from the station c to the station c' into that receptacle of the closing apparatus the bolt 14 of which was released by the electromagnet 23. The released bolt then travels further with the insufficiently filled package in the closing apparatus II.

A switch rail 26, arranged on a two-armed lever 25, Figs. 1, 3 and 4, is provided in front of the station f' furnished with the above-mentioned gumming mechanism. The lever 25 is pivotally mounted on the pin 27 on the frame 37 of the gumming mechanism and is held in its highest position by a counter-weight 28. On the pin 27 a lever 29 is also secured, which carries at its free end an adjustable stop-screw 30, which can act on a locking lever 31. This lever is freely pivoted on a pin 32 on the said frame 37, and is controlled by a counter-weight 33. This locking lever, with its projecting nose 31', can engage a suitable stop pin 80' of the driving rod 80 for the downward movement of the gumming bar carriage 61, and then lock this latter in its highest position when the gumming mechanism is not to come into operation. The horizontal reciprocation of the said carriage is hereby not interrupted.

Before the insufficiently filled package has arrived at the gumming station f', the front end of the bolt 14 runs on the rail 26, and thus turns the lever 25 downwards, which in its turn moves the lever 29 with its stop-screw 30 against the locking lever 31 so that this latter can engage the stop pin 80' of the driving rod 80 for the gumming mechanism and thus lock this latter. By this means, the application of gum to the closing flaps is prevented, and the further operations in the closing of the flaps remain without effect. The package is, therefore, easily recognizable as unclosed, after ejection from the machine, so that the completion of the filling and the final closure can be done by hand.

On the further movement of the feed-wheel 10, the particular bolt 14 which has been released comes into contact with a stationary rail 35, by which the bolt is brought back into its inoperative position, shown at the left in Figure 3, and is again locked by the locking lever 16.

The apparatus is equally suitable both for packing machines for packages consisting of an inner bag and an outer card-board envelope, as well as for simple packages in which, for instance, the adhesion of the two laterally projecting points is effected by applying gum.

It is obvious that various changes and modifications may be made in the construction of the described and illustrated device without departing from my invention and the scope of the appended claims.

What I claim as my invention, is:—

1. In a packing machine having a plurality of successive stations, in combination, feeding means adapted to convey the packages step-by-step to successive stations, means for filling the packages, means for closing the packages comprising gumming means for the closure of the package, locking means adapted to render inoperative said gumming means, an electromagnet comprising an energizing contact device and adapted to control said locking means, and a weighing apparatus arranged at a station situated between the stations for filling and closing the packages, said weighing apparatus being adapted to close said energizing contact device of the electro-magnet when there is an insufficiently filled package, and said electro-magnet being adapted to render inoperative said locking means when the insufficiently filled package arrives at the station where said gumming means is located.

2. In a packing machine comprising a separate filling apparatus and a separate closing apparatus having each a plurality of stations and a step-by-step feeding mechanism with a corresponding number of receptacles for the packages, and means for transferring a package from a station of the filling apparatus to a station of the closing apparatus said latter apparatus having an ejection station, in combination, gumming means for the closure of the package, locking means adapted to render inoperative the gumming means, a stop member provided for each receptacle of the feeding mechanism for the closing apparatus and adapted to release said locking means, an electro-magnet comprising an energizing contact device and adapted to release said stop members, and a weighing apparatus provided at a station of the filling apparatus and adapted to close said energizing contact device when there is an insufficiently filled package, said electro-magnet being arranged in the filling apparatus at a station situated between the ejection station and the transfer station by the same number of feeding steps in advance of the transfer station as the weighing apparatus is in advance of the transfer station in the filling apparatus so that an insufficiently filled package which has caused the operation of the electromagnet through the intermediary of the weighing apparatus reaches that pocket of the feeding mechanism of the closing apparatus the stop device of which was released by the energized electromagnet.

3. A packing machine as specified in claim 2, in which there is provided a radially displaceable bolt as a stop member for each receptacle of the feeding mechanism of the closing apparatus, a spring adapted to displace the bolt into its operative position, and a lever adapted to hold said bolt locked in its inoperative position against the action of the spring, said lever being constructed as an armature for the electromagnet, so that this latter in its energized condition releases the locking lever, and the bolt belonging thereto is moved forward by the spring into its operative position.

4. In a packing machine comprising a plurality of intermittently advancing package stations including a package weighing station and a package sealing station, the combination of means for introducing a predetermined quantity of commodity into each package, package weighing means at the weighing station, means at the sealing station for applying adhesive to the packages, and means controlled from the weighing station to render said adhesive applying means inoperative for a package containing less than the predetermined quantity of commodity.

5. In a packing machine comprising a plurality of intermittently advancing package stations including a package weighing station and a package sealing station, the combination of means for introducing a predetermined quantity of commodity into each package, package weighing means at the weighing station, electric contact means at the weighing station, an electromagnet at one of the other stations in circuit with said contact means, means at the sealing station for applying adhesive to the packages, and means at the weighing station engageable with said contacts when a package which contains less than the predetermined quantity of commodity reaches said weighing station to energize said electromagnet and render the adhesive applying means inoperative for said package containing less than the predetermined quantity of commodity.

6. In a packing machine, the combination of a first package advancing means comprising a plurality of stations including a weighing station, a second package advancing means comprising a plurality of stations including a sealing station, means for introducing a predetermined quantity of commodity into each package before such package reaches the weighing station, means for intermittently advancing said first and second package advancing means in synchronism, package weighing means at the weighing station, means at the sealing station for applying adhesive to the packages, means beyond the weighing station for transferring a package from the first to the second package advancing means, and means controlled from the weighing station to render said adhesive applying means inoperative for a package containing less than the predetermined quantity of commodity reaching said sealing station.

7. In a packing machine, the combination of a first package advancing means comprising a plurality of stations including a weighing station and a transfer station spaced a predetermined distance from the weighing station, a second package advancing means comprising a plurality of stations including a transfer station and a sealing station, means for intermittently advancing the first and second package advancing means in synchronism, means for introducing a predetermined quantity of commodity into each package, package weighing means at the weighing station, means at the sealing station for applying adhesive to the packages, an electromagnet at the second package advancing means spaced from its transfer station the same distance as the weighing station at the first package advancing means is spaced from its transfer station, means for moving the packages from the first to the second transfer station, electric contact means at the weighing station in circuit with said electromagnet, and means at the weighing station engageable with said contacts when a package containing less than the predetermined quantity of commodity reaches said weighing station to energize said electromagnet and render the adhesive applying means inoperative for said package containing less than the predetermined quantity of commodity.

PAUL GANGLER.